Patented Aug. 29, 1944

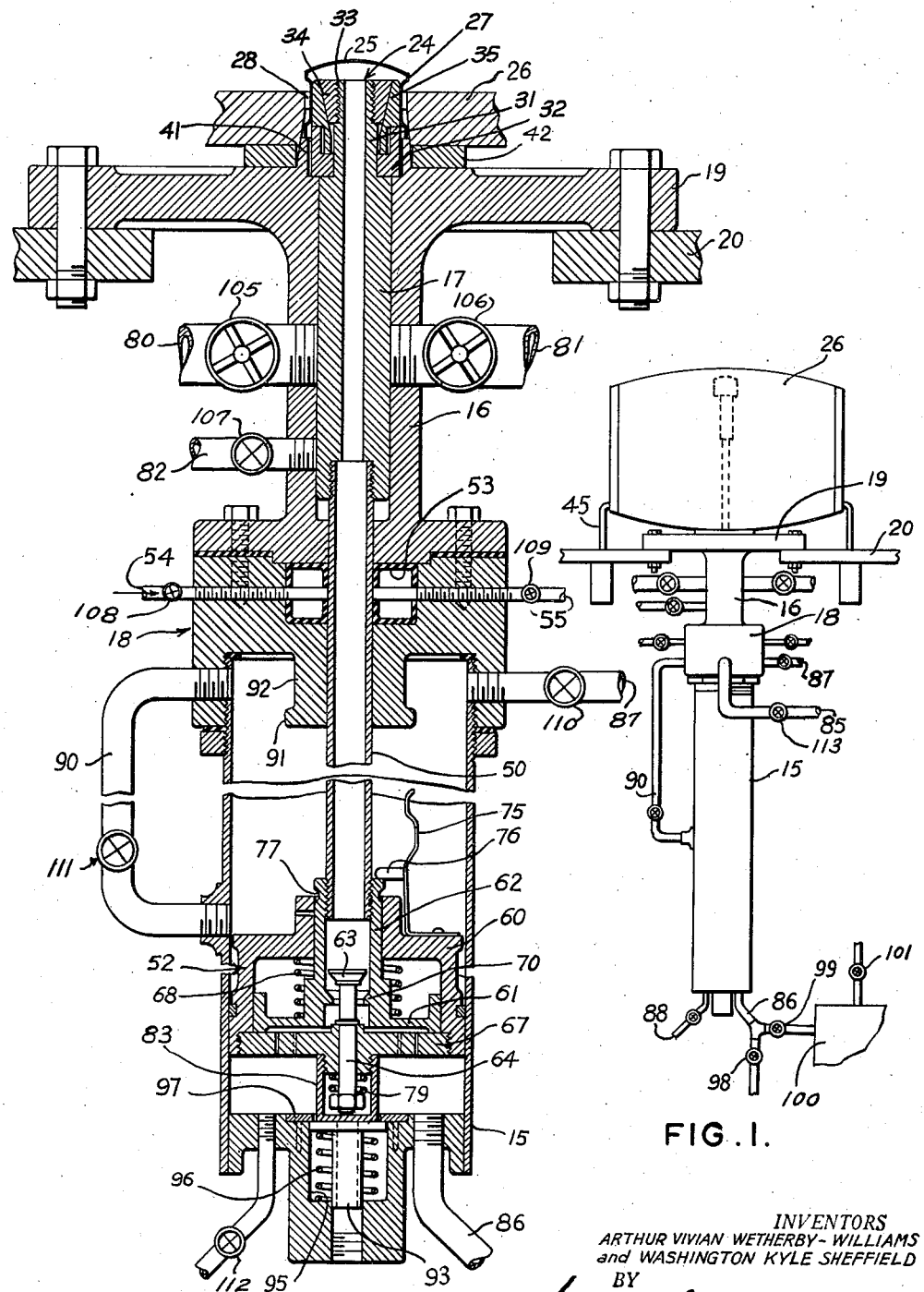

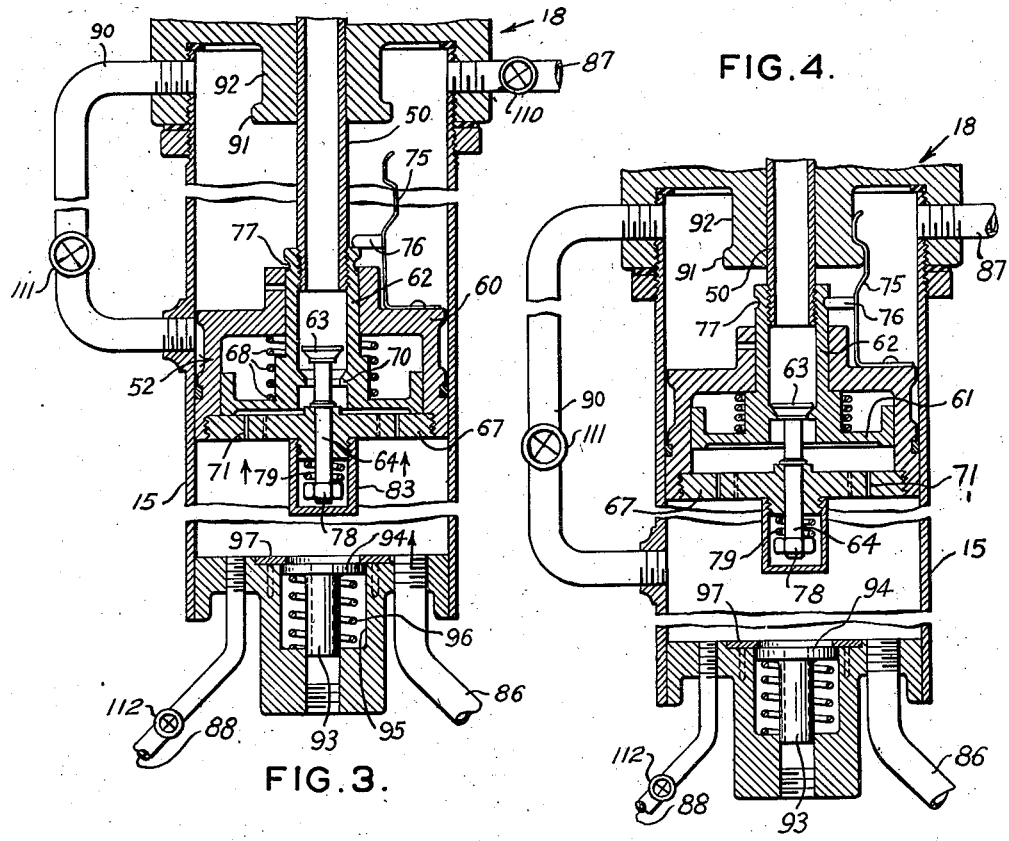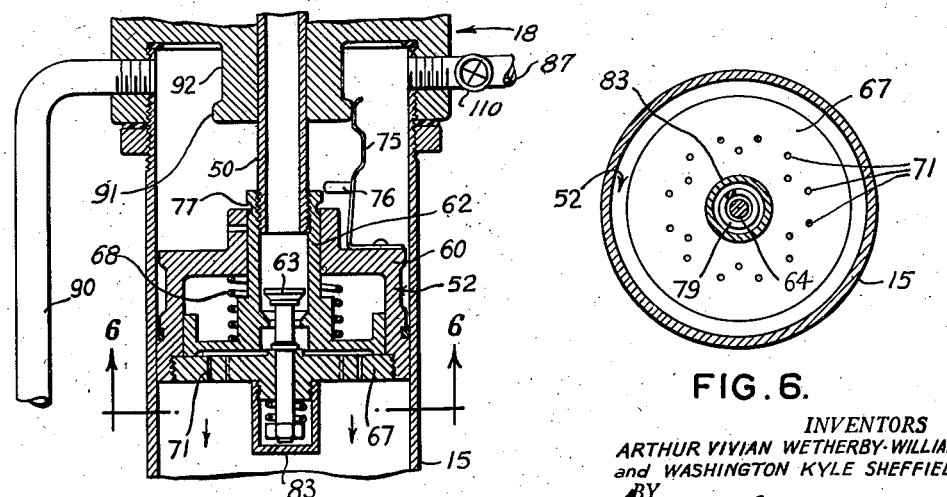

2,357,245

UNITED STATES PATENT OFFICE 2,357,245

APPARATUS FOR FILLING AND CLOSING CONTAINERS

Arthur Vivian Wetherby-Williams, New York, N. Y., and Washington Kyle Sheffield, New London, Conn.

Application April 22, 1942, Serial No. 439,974

2 Claims. (226—117)

This invention relates to a method and apparatus for filling and closing containers, such as beer kegs, and more particularly apparatus of that type in which the container is first sterilized and subsequently filled and closed without danger of introducing bacteria into the container between the time sterilization ends and the time the container has been hermetically sealed.

When the beer is introduced into a container in which the gas pressure is below the pressure of the carbon dioxide in the beer, foaming will occur, the extent of which depends on the pressure differential. Some foaming may occur when the pressures are substantially equal if the gas in the container is air and not carbon dioxide, as the result of partial pressure considerations. However, air under superatmospheric pressure of air is much better than air under ordinary atmospheric pressure.

If the container at the time beer is admitted is filled with steam the condensation of the latter by the cool beer will produce a sub-atmospheric pressure and worse foaming will occur than if the container was full of air at atmospheric temperature and pressure.

Where a container is first sterilized by steam which displaces the air at the same time it produces its sterilizing effect, the container should be connected to a source of sterile gas, preferably carbon dioxide, under pressure, either before or simultaneously with the admission of beer into the container. The beer is then admitted against a gas back pressure which checks if it does not entirely prevent foaming. As the beer flows in the gas is displaced and returned to its source to be used for creating a back pressure when the next container is filled.

Finally the container should be closed while the beer therein is still under pressure.

The operations above described can most conveniently be carried out while the container is in inverted position.

The general procedure embodying the improvements of the present invention, both as to process and apparatus, involves the use of a cup-shaped closure of soft metal which initially is of small enough diameter to pass through the bung hole. This closure is placed in inverted position on top of a combination snifter tube and expanding head which are then pushed upwardly through the bung hole until the closure and expanding head are near the top of the keg. Steam is then blown into the keg to sterilize it. After sterilization is complete and incidentally most of the air has been replaced by steam, the container is connected to a source of gas under superatmospheric pressure, advantageously sterile carbon dioxide. Next sterilized beer is introduced until it starts to overflow through the snifter tube. During this filling operation the carbon dioxide or other gas used to create a back pressure in the container is displaced and returned to its source for use with the next keg. Then, after shutting off the beer and closing the snifter tube the expanding head with the closure thereon is lowered until the latter is properly positioned in the bung hole. Next the expanding head is extended radially to expand the closure and press its periphery against the walls of the bung hole. Finally the expanding head is contracted and the filled and closed keg is lifted off the head.

Apparatus for filling containers while inverted is disclosed in United States Patent Number 2,210,017, issued August 6, 1940. One of the objects of this invention is to improve that apparatus and adapt it for use in filling standard beer kegs.

The apparatus of Patent Number 2,210,017 was designed for mechanical operation. I have found that quicker, smoother and more readily controlled operation can be secured by fluid pressure operation, usually steam.

When a keg is filled with beer from the bottom and the displaced gases are exhausted from the top through a snifter tube there comes a time when the beer starts to overflow through the snifter tube.

One of the important objects of the present invention is to provide means for automatically stopping such overflow as soon as it begins, so as to avoid the necessity of having to watch for the first overflow of beer to ascertain when to shut off the beer supply and/or close the snifter tube. While the overflow may be stopped either by shutting off the beer supply or closing the snifter tube, the more convenient method of the two is the latter. To accomplish this the snifter tube is provided with a restricted outlet which, while large enough to let air escape without much back pressure is sufficiently small to retard the flow of beer enough to build up considerable pressure behind it. A pressure-differential-operated valve, set to remain open so long as air is flowing out, but to close as soon as beer starts to flow, closes the snifter tube before any considerable loss of beer has occurred.

The containers for which the apparatus of Patent Number 2,210,017 was particularly designed are of metal with a cylindrical mouth provided at its outer end with an inwardly extending flange or lip to prevent the pressure in the container blowing the closure out of the mouth. The ordinary beer keg has a bung hole with slightly conical walls, the largest diameter being on the outer side of the keg, with no inwardly extending flange to hold a closure in place.

Another object, therefore, of the present invention is to provide means whereby a closure can be inserted and expanded in the bung hole in such a way that it will not subsequently be blown out of the hole. This is accomplished by lowering the closure part way only into the bung hole and then expanding that part of the closure which remains inside the keg to a greater diameter than that of the inner margin of the bung hole, or, where a gasket is used, to a diameter such that the over-all diameter of closure plus gasket is greater than that of the bung hole. The closure is then held in place by its resistance to deformation—not merely by friction.

One suitable form of construction is illustrated, by way of example, in the accompanying drawings, wherein:

Figure 1 is an elevation of the machine as a whole;

Figure 2 is a central vertical section with the closure positioned in the bung hole of a keg;

Figure 3 is a central vertical section of the operating cylinder and piston during the time the snifter tube is being raised;

Figure 4 is a view similar to Figure 3 with the piston at the upper end of its stroke and the valve in the piston closed;

Figure 5 is a view similar to Figure 4 as the piston begins its downward stroke; and Figure 6 is a section on the line 6—6 of Figure 5.

Referring to the drawings, the apparatus comprises two main fixed parts, a cylinder 15 and a hollow guide 16 for the upper part 17 of the snifter tube, these parts being connected by a gland 18. At the top of the guide 16 is a flange 19 by which the apparatus may be hung between two beams 20. At the upper end of the snifter tube is the closure-expanding head, designated generally as 24. This head supports the closure 25 until it has been expanded into position in the bung hole of the keg 26.

The closure 25 is of inverted cup-shaped form and is provided with an annular projecting rib 27 around its upper part. Below this rib is placed a gasket 28. When the closure is expanded the outer part of this rib is extended over the inner margin of the bung hole so that the closure cannot be blown out of the bung hole.

The closure-expanding head is mounted on the end of the upper part 17 of the snifter tube. Such end includes a reduced portion 31 on which a collar 32 is slidably mounted and a further-reduced threaded portion 33 on which an inverted cone 34 is screwed. The bottom of the latter is of larger diameter than the portion 31 so that it forms a shoulder to limit the upward movement of the collar 32. Loosely mounted around the cone 34 are a series of segments 35. The inner faces of these segments are conical, to fit the conical surface of the cone 34. These segments are moved outwardly when the cone is moved downwardly.

This relative movement is the result of the engagement of the collar 32 with the bottom of a recess in the flange 19, which acts, through the intermediary of the collar, as an abutment preventing further downward movement of the segments 35. Consequently, any downward movement of the cone after the parts have been brought into the position shown in Figure 1, produces radially outward movement of the segments. The cone in this movement acts like a wedge forcing the segments apart against the inner wall of the closure.

Around the recess is an upstanding flange 41 of the same outside diameter as the bung hole so that when the keg has been inverted it can be accurately positioned by moving it around until the flange slips into the mouth of the bung hole. The clamps 45 are then brought into engagement with the ends of the keg, as shown in Figure 1. A rubber gasket 42 thinner than the height of the flange 41 makes a fluid-tight contact between the outside of the keg and the flange 19.

The mechanism for operating the snifter tube and the closure-expanding head carried thereby will now be described.

The lower part 50 of the snifter tube extends through the gland 18, which contains two annular rubber-composition packing rings 53. Steam under greater pressure than the pressure in the keg at any time is admitted into the interior of the gland through a pipe 54 and valve 108 to press the inner parts of the packing rings against the tube 50. With such an arrangement, if there is any leakage into the vessel, it is of sterile steam. Condensate is discharged through pipe 55 and valve 109.

To the lower end of the tube 50 is connected a piston, designated generally as 52. The piston comprises three main parts; an outer shell 60 which makes fluid-tight contact with the cylinder 15, a supplemental piston 61 slidably mounted inside the shell 60, and a valve 63 having a stem 64. This valve is adapted to cooperate with a valve seat 70 in the hollow stem 62 of the supplemental piston.

The shell 60 is of inverted cup-shape, the top portion of which is provided with a central aperture in which the stem 62 can slide. These parts are made to fit closely so as to be substantially steam-tight. The bottom of the shell 60 is closed by a disk 67. A light spring 68 normally holds the shell 60 in elevated position, so that the supplemental piston 61 is at the bottom of the chamber therein, as shown in Figures 2 and 3.

The upper end of the stem 62 of the supplemental piston 61 is threaded for the reception of the lower end of the snifter tube 50. Near the bottom of the stem is located the seat 70 for the valve 63. When the shell 60 is in the up position fluid can pass around the valve and over its seat to the space between the under side of 61 and the top of the disk 67. When the shell 60 is in the down position, as shown in Figure 4, the valve and its seat are in contact and the snifter tube is closed. The disk 67 has a number of small holes 71, therein. These holes offer only slight resistance to the flow of gas, such as air or steam, but much greater resistance to a flow of liquid at the same rate. When the resistance to flow is slight there is not enough differential pressure on the two sides of the disk 67 to force the shell 60 downwardly against the pressure of its spring 68. When, however, the differential pressure is increased, the shell 60 is pushed down and the passage around the valve is closed. As soon as such passage is closed the pressure below the piston 61 drops and the shell would then move upwardly again and open the valve, unless otherwise prevented. To avoid periodic alternate opening and closing of the valve when liquid is flowing down the snifter tube, a spring 75 carrying a catch 76 is mounted on top of the shell 60. This catch 76 slips into an annular groove 77 in the upper end of the stem 62, as shown in Figure 4, as soon as the shell has moved into valve closing position.

It will be noted that the valve stem 64 is slidably mounted on the disk 67 and is arranged so that its lower end extends below the bottom thereof. This projecting lower end is surrounded by a spring 79 held in compression by a nut 78. A cap 83 covers the end of the valve stem for a purpose which will be described later.

The object of permitting relative movement between the valve stem 64 and the disk 67 is to insure that the valve remains closed after the catch 76 has engaged the groove 77. If no relative movement were possible, it would be necessary to construct the parts very accurately to permit simultaneous proper seating of the catch in its groove and of the valve on its seat. Unless the parts were not made extremely accurately, when the catch was in position, the valve would be above its seat permitting leakage, or, when the valve was on its seat, the catch would not be properly positioned in its groove. The construction shown permits the shell 60 and the valve 63 to be moved down simultaneously until the valve strikes its seat 70 and then allows the shell to continue its downward movement a short distance further to bring the catch exactly opposite the groove 77.

The guide member 16 is provided with beer and steam admission and condensate discharge connections, 80, 81 and 82, respectively. These connections controlled by valves 105, 106 and 107 are in communication with the interior of the keg when the snifter tube is in the elevated position shown in dotted lines in Figure 1. When the parts are in such position the small diameter lower part of the snifter tube is opposite the connections in question so that free communication with the interior of the keg is obtained.

The cylinder 15 has steam connections, 85 and 86 at its two ends respectively. Flow through connection 85 is controlled by a valve 113. Connection 86 has two branches, one leading through valve 98 to a source of steam, and the other through valve 99 to a reservoir 100 of carbon dioxide under pressure. This reservoir has an automatic blow-off valve 101 to permit the escape of carbon dioxide whenever the pressure in the reservoir exceeds a predetermined value. Connections 87 and 88, controlled by valves 110 and 112, are for exhaust steam, carbon dioxide, air and/or condensate, as the case may be.

To slow down the last part of the upward movement of the snifter tube after steam has been admitted into the bottom of the cylinder, a small diameter pipe 90, controlled by valve 111, is connected at one end to the top of the cylinder and at the other end to a point some distance below it. As soon as the piston passes the lower end of this pipe, a small amount of steam can by-pass the piston, thereby reducing the difference in pressure between the two sides of the piston. This pressure differential decreases as the piston rises since the space above the latter is reduced at the same time that steam is flowing into such space through the restricted passage afforded by the pipe 90.

At the upper end of the travel of the piston the top of the spring 75 slips over an annular rib 91 on a boss 92 depending from the cylinder head, as shown in Figure 4, and holds the piston and snifter tube in raised position until steam is applied to the upper end of the cylinder. Discharge pipe 87 is closed and steam to pipe 86 shut off by closing valve 98. Next steam is supplied through pipe 81 to sterilize the interior of the keg. Discharge pipe 82 is open during this period to permit the escape of condensate. The air in the keg displaced by the steam flows down through the snifter tube and out through discharge pipe 88. Some of it may also be discharged through the condensate pipe 82.

When sterilization is complete the valves controlling pipes 81, 82 and 88 are closed, and valve 99 opened to permit carbon dioxide to flow from the reservoir 100 into the keg to produce the desired back pressure therein. Then valve 105 is opened to permit cool pasteurized beer to be introduced through pipe 80. As the cool beer contacts the steam in the keg it produces condensation which tends to lower the pressure therein. However, as the pressure begins to drop more carbon dioxide flows in from the reservoir 100. As the beer continues to flow into the keg condensation diminishes and after a time, instead of carbon dioxide being sucked into the keg, carbon dioxide is driven out of the keg back into the reservoir. Normally the beer is introduced into the keg at about 60 to 65° F. and 60 lbs. pressure, which is the usual pressure of the carbon dioxide in good beer. The pressure in the reservoir 100 is maintained at about 40 lbs. With a back-pressure of 40 lbs. the pressure differential causing the beer to flow into the keg is about 20 lbs.

As the back pressure is below the carbon dioxide pressure of the beer, the latter loses some of its carbon dioxide during the filling operation. As a result, more carbon dioxide is expelled from the keg during the latter part of the filling operation than is drawn in prior to or during the first part of that operation. The automatic pressure relief valve 101 allows the excess carbon dioxide to escape.

When the level of the beer reaches the top of the snifter tube liquid starts to flow down the latter. As soon as beer reaches the piston and begins to flow out through the fine holes 71, sufficient differential pressure is created to close the valve 63 and bring the parts into the position shown on Figure 4. The only outlet to the keg having been closed, no more beer enters.

After sufficient time has elapsed to ensure that the keg has been filled, the operator closes the beer pipe valve 105 and valve 99 leading to the reservoir 100, opens valve 112 on the discharge pipe 88 and admits steam through pipe 85 and valve 113 to the upper end of the cylinder. As soon as the piston starts down, the end of the spring 75 rides over the rib 91 and releases the catch so that the valve 63 opens. Before sufficient beer can flow down the snifter tube to again close the valve 63, the closure has been positioned in the bung hole and an instant later expanded.

So long as the conical head of the snifter tube is in the depressed position the filled and closed keg cannot be removed. To raise the conical head sufficiently to free the segments from frictional engagement with the walls of the expanded closure, a plunger 93, having an enlarged head 94 and a spring 96 beneath, under compression, is arranged in a recess 95 in the lower cylinder head. An annular ring 97 engages the outer margin of the head 94. When the closure is positioned in the bung hole, but before the conical head has started to move down to force the segments outwardly, the bottom of the cap 83 has been brought into contact with the top of the plunger head 94.

Further downward movement of the entire snifter tube mechanism under steam pressure causes the spring 96 to be compressed. As soon as steam pressure is released the spring 96 pushes the snifter tube mechanism upwardly sufficiently to allow the segments to be brought into contracted position.

We claim:

1. A filling apparatus for containers comprising a vent for permitting air to escape while the container is being filled with liquid, a restricted outlet for said vent to produce a rise in pressure on the two sides of said outlet when air-flow ceases and liquid flow begins, and a pressure-differential-operated valve constructed to close said vent when the pressure rises due to the flow of liquid through said outlet.

2. A filling apparatus for containers comprising a snifter-tube adapted to extend upwardly through the mouth of the container while inverted to the top of the container to permit air to escape downwardly therethrough while the container is being filled with liquid, a restricted outlet near the bottom of said tube to produce a rise in pressure on the two sides of said outlet when air-flow ceases and liquid flow begins, and a pressure-differential-operated valve constructed to close said snifter-tube when the pressure rises due to the flow of liquid through said outlet.

ARTHUR VIVIAN WETHERBY-WILLIAMS.
WASHINGTON KYLE SHEFFIELD.